L. C. KRUSE.
STARTER FOR INTERNAL COMBUSTION ENGINES.
APPLICATION FILED MAY 21, 1918.
1,281,028.
Patented Oct. 8, 1918.
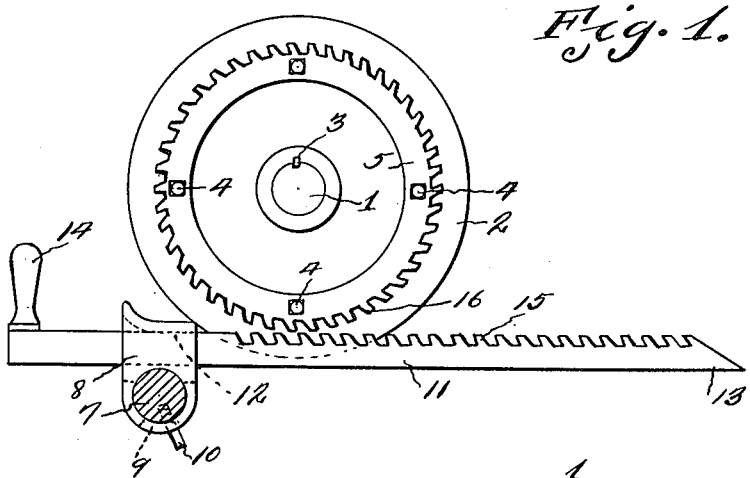
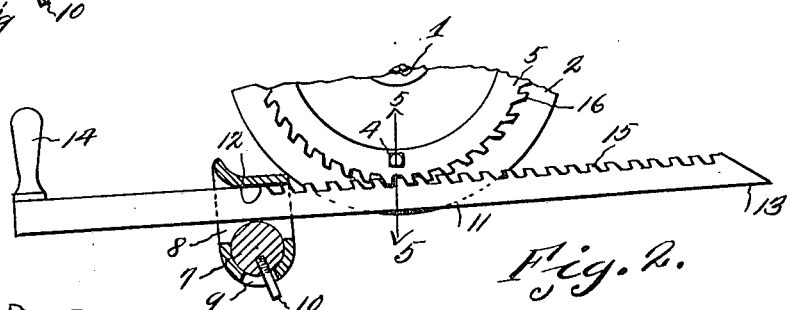
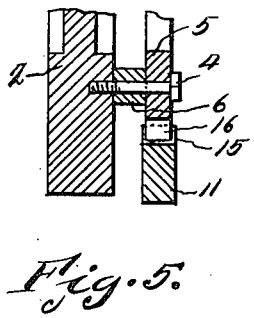
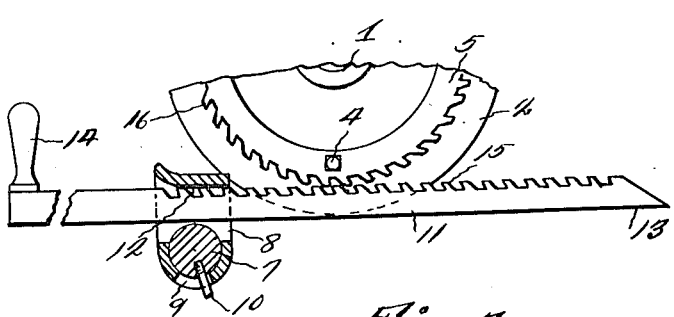
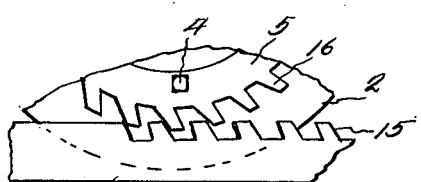
Inventor
Lewis C. Kruse
By
his Attorney

UNITED STATES PATENT OFFICE.

LEWIS C. KRUSE, OF NEENAH, WISCONSIN.

STARTER FOR INTERNAL-COMBUSTION ENGINES.

1,281,028. Specification of Letters Patent. Patented Oct. 8, 1918.

Application filed May 21, 1918. Serial No. 235,757.

*To all whom it may concern:*

Be it known that I, LEWIS C. KRUSE, a citizen of the United States, residing at Neenah, in the county of Winnebago and State of Wisconsin, have invented certain new and useful Improvements in Starters for Internal-Combustion Engines, of which the following is a specification, reference being had therein to the accompanying drawing.

The invention relates to manually operating starting mechanisms for internal combustion engines and more particularly for engines used on automobiles, tractors and other conveyances, however the invention may be used for starting engines otherwise used.

A further object is to provide a starting bar provided with a toothed rack, adapted to engage a gear secured to the fly wheel, or driving shaft of an internal combustion engine.

A further object is to construct the teeth of the starting rack and the teeth of the gear so that they will come out of engagement when the engine starts, also so constructed that the gear will be thrown out of engagement with the teeth of the toothed rack if the engine back-fires.

With the above and other objects in view, which will appear as the description proceeds, the invention resides in the details of construction and combination and arrangement of parts, hereinafter described and claimed, it being understood that changes in the precise embodiment of the invention herein described can be made within the scope of the claims, without departing from the spirit of the invention.

In the drawings:—

Figure 1 is a view showing the operating rack bar in position for engaging the starting gear on the flywheel of an engine.

Fig. 2 is a similar view to Fig. 1, showing the teeth of the rack bar meshing with the flywheel gear.

Fig. 3 is a view similar to Fig. 2, showing the teeth of the gear disengaging from the teeth of the rack bar as the engine starts.

Fig. 4 is a detail view showing the teeth disengaging when the engine back-fires.

Fig. 5 is a vertical sectional view on line 5—5 of Fig. 2.

Referring more especially to the drawings, the numeral 1 designates the driving shaft of a conventional form of internal combustion engine and 2 the usual flywheel thereon, which is keyed thereto by means of a key 3. Secured to one side of the flywheel by means of bolts 4, is a gear 5, which is spaced from the flywheel by means of collars 6, said gear being adapted to rotate with the flywheel when engine is in operation.

Rockably mounted upon a stationary part 7 of the frame of the tractor or automobile is a guide 8, which is provided with a slot 9, adapted to receive the pin 10, which is threaded into the part 7, of the frame of the tractor. This slot and pin form means for limiting the rocking movement of the guide 8. When it is desired to start the engine a rack bar 11 is inserted into the opening 12 of the rockable guide and when the rack bar is in position, the pin 10 will limit the downward movement of the end 13 of the rack bar. When the rack bar is in this position, the operator grasps the rack bar by the handle 14, tilts the rack bar until the teeth 15 are in mesh with the teeth 16 of the gear 5 and exerts a pull upon the rack bar, sliding the same in the guide 8, thereby imparting a revoluble movement to the flywheel and shaft of the engine for starting the engine. These operations are repeated until the engine starts, after which the rack bar is removed from the guide 8.

It will be seen that when the engine starts that the teeth of the gear and rack bar will be thrown out of mesh by means of the inclined teeth 15 and 16, of the rack bar and gear. It is to be understood that the gear may be placed on the shaft if desired, or the shaft may be started by a series of gears.

If the engine should back-fire, the rack bar 11 will be thrown out of engagement with the gear by means of the teeth 15 and 16 as shown in Fig. 4.

The invention having been set forth what is claimed as new and useful is:—

1. A starting mechanism for internal combustion engine comprising a rack bar slidably mounted in a rockable guide located at one side of the vertical center line of a gear for starting an engine, said gear and rack bar being provided with teeth so shaped that when the engine starts they will be thrown out of mesh.

2. A starting mechanism for internal combustion engines comprising a rack bar slidably mounted in a rockable guide located at one side of the vertical center line of a gear for starting an engine, means for limiting the rockable movement of the guide, said gear and rack bar being provided with teeth so shaped that when the engine starts they will be thrown out of mesh and means whereby when the engine back fires the teeth of the gear and rack bar will be thrown out of mesh.

In testimony whereof I hereunto affix my signature.

LEWIS C. KRUSE.